United States Patent
Weiß et al.

(10) Patent No.: US 11,032,647 B2
(45) Date of Patent: Jun. 8, 2021

(54) MULTI-LAYER LOUDSPEAKER COVER AND VEHICLE

(71) Applicant: AUDI AG, Ingolstadt (DE)

(72) Inventors: Simon Weiß, Titting (DE); Manuel Wenzel, Geisenfeld (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/607,042

(22) PCT Filed: Aug. 16, 2018

(86) PCT No.: PCT/EP2018/072186
§ 371 (c)(1),
(2) Date: Oct. 21, 2019

(87) PCT Pub. No.: WO2019/034724
PCT Pub. Date: Feb. 21, 2019

(65) Prior Publication Data
US 2020/0196059 A1   Jun. 18, 2020

(30) Foreign Application Priority Data

Aug. 18, 2017   (DE) .......................... 102017214401.7

(51) Int. Cl.
*H04R 7/08*   (2006.01)
*H04R 1/02*   (2006.01)
(52) U.S. Cl.
CPC .............. *H04R 7/08* (2013.01); *H04R 1/025* (2013.01); *H04R 2499/13* (2013.01)

(58) Field of Classification Search
CPC ...... H04R 7/08; H04R 1/025; H04R 2499/13; H04R 1/023; H04R 1/086; B60R 11/0217
See application file for complete search history.

(56) References Cited

U.S. PATENT DOCUMENTS

| | | | | |
|---|---|---|---|---|
| 3,108,653 | A | * 10/1963 | Valldeperas | ........... H04R 1/345 181/150 |
| 4,043,544 | A | 8/1977 | Ismer | |
| 5,229,185 | A | * 7/1993 | Shiota | ..................... H04N 5/642 348/E5.13 |

(Continued)

FOREIGN PATENT DOCUMENTS

| | | | |
|---|---|---|---|
| AT | 287956 B | 2/1971 | |
| CN | 202873045 | * 4/2013 | ............... H04R 9/02 |

(Continued)

OTHER PUBLICATIONS

International Search Report and Written Opinion of the International Searching Authority directed to related International Patent Application No. PCT/EP2018/072186, dated Oct. 17, 2018, with attached English-language translation; 31 pages.

(Continued)

*Primary Examiner* — Oyesola C Ojo
(74) *Attorney, Agent, or Firm* — Sterne, Kessler, Goldstein & Fox P.L.L.C.

(57) ABSTRACT

The disclosure relates to a multi-layered speaker cover for covering a speaker. The speaker cover has at least one first layer and a second layer, wherein the first layer is an air-permeable layer and the second layer is a layer with through-holes for reducing dynamic pressure.

20 Claims, 1 Drawing Sheet

(56) References Cited

U.S. PATENT DOCUMENTS

| | | | | |
|---|---|---|---|---|
| 9,129,513 | B1* | 9/2015 | Clarke | G01L 5/228 |
| 2002/0110250 | A1* | 8/2002 | Schwald | H04R 1/086 |
| | | | | 381/91 |
| 2007/0194592 | A1* | 8/2007 | Lindsay | B60R 13/083 |
| | | | | 296/97.23 |
| 2011/0105178 | A1* | 5/2011 | Cowett | G11B 31/00 |
| | | | | 455/556.1 |
| 2011/0314589 | A1 | 12/2011 | Vito et al. | |
| 2016/0360318 | A1* | 12/2016 | Tsai | H04R 1/086 |

FOREIGN PATENT DOCUMENTS

| | | | |
|---|---|---|---|
| DE | 2023173 | A1 | 11/1971 |
| DE | 2510182 | A1 | 9/1976 |
| DE | 9105713 | U1 | 7/1991 |
| DE | 29722465 | U1 | 4/1999 |
| DE | 10220536 | C1 | 8/2003 |
| DE | 19649140 | A1 | 9/2003 |
| DE | 10 2008 011084 | A1 | 8/2009 |
| DE | 10 2009 036714 | A1 | 2/2011 |
| DE | 10 2017 214401 | A1 | 2/2019 |
| EP | 0688142 | A2 | 12/1995 |
| EP | 2683176 | A1 | 1/2014 |
| EP | 3153071 | A1 | 4/2017 |
| GB | 2249454 | A | 10/1991 |
| JP | 2017124804 | * | 7/2017 ............ B60K 28/02 |
| KR | 200472005 | Y1 | 4/2014 |
| WO | WO 2019/034724 | A1 | 2/2019 |

OTHER PUBLICATIONS

OHM Germany GmbH: Product Data Sheet for the Loudspeaker 'BR-18B'; www.ohm-germany.com, with attached English-language translation; 4 pages.

Der Brockhaus: vol. L-Z; F.A. Brockhaus GmbH, 1999, with attached English-language translation; 3 pages.

English translation for Austrian patent publication AT 287956 B, published Feb. 10, 1971, 3 pages, translated by EPO Patent translate at https://translationportal.epo.org.

English translation for German patent publication DE 9105713, published Jul. 18, 1991, 7 pages, translated by EPO Patent translate at https://translationportal.epo.org.

International Preliminary Report on Patentability directed to related International Patent Application No. PCT/EP2018/072186, dated Apr. 17, 2019, with attached English-language translation; 11 pages.

* cited by examiner

MULTI-LAYER LOUDSPEAKER COVER AND VEHICLE

TECHNICAL FIELD

The present disclosure relates to the field of automotive engineering, in particular, the present disclosure relates to a multi-layered speaker cover. The disclosure also relates to a motor vehicle.

BACKGROUND

Vehicles are equipped with speakers, for example, to operate an audio system. Speakers in the vehicle can also be part of an entertainment system. During operation of the speaker, the vibrations of the speaker also cause components in the surrounding environment to vibrate. However, these vibrations of the components can be perceived by occupants and are sometimes perceived as unpleasant and disturbing. In order to prevent the co-vibration of components, there are currently solutions available that seek to decouple the vibrations.

DE 10 220 536 C1 describes a speaker arrangement with a foam molding disposed on a fixed structure for vibration and sound absorption. The foam part is formed in one piece and has an opening for receiving a speaker. Further, the foam part has projections for engaging a fixed structure and bendable holding elements for securing the speaker in the receiving opening.

DE 10 2008 011 084 A1 describes a device for fastening a speaker to a holder by means of at least one pair of connecting elements. Here, the device has a receiving element and an engaging element which engages into the receiving element in a positively-locking and/or friction-locking manner, wherein the engaging element and/or the receiving element are designed to be elastic. The elasticity of at least one of the connecting elements causes the support to be largely mechanically decoupled from the speaker vibrations.

DE 10 2009 036 714 A1 describes a body section of a body shell of a vehicle. In this case, at least one opening is provided in the area of an A pillar, the opening having a circumferential collar in which a speaker device can be disposed. By indirectly arranging the speaker device in or on the body shell of the vehicle, which is vibration- and/or oscillation-resistant, attachment of the speaker device to the much heavier body of the vehicle becomes possible. As a result, transmission of vibrations or oscillations from the speaker device to the body shell can be prevented. Finally, comfort-reducing noise can be avoided.

The aforementioned solutions use a decoupling element between the speaker and the surrounding fastening device in order to avoid speaker vibrations onto the surrounding components. However, these decoupling elements are arranged around the speaker and occupy space accordingly.

However, it is preferred that speakers in the vehicle are integrated, for example into paneling, in order to save space. The tendency observed here is that less space is available in the vehicle for the speakers, and speakers are placed closer to existing surfaces, for example as part of paneling. It is therefore possible for speakers to be placed on surfaces, and that they can be touched by vehicle occupants. When touched, the occupants can feel the vibrations of the speaker. However, the covers have the advantage that they mechanically protect the speaker and avoid contamination, so that the speaker can be operated trouble-free. A disadvantage of the use of covers, however, is that the adjacent components, as well as the covering components, co-vibrate during operation of the speaker. Therefore, not only is lateral decoupling of the speaker needed, but also decoupling devices above a speaker, i.e. when the speaker has a cover.

It is therefore the object to provide a design for covering speakers while at the same time reducing or entirely preventing disturbing vibrations for occupants in the vehicle compartment.

DETAILED DESCRIPTION

Figure 1:
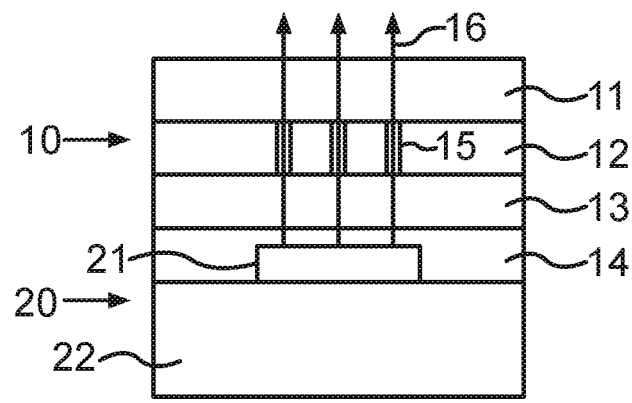
FIG. 1 shows a cross-sectional view of a multi-layered speaker cover, according to some embodiments of the disclosure.

This object of the present disclosure is achieved with a multi-layered speaker cover and a vehicle. Further embodiments can be found in the dependent claims.

According to the disclosure, a multi-layered speaker cover for covering a speaker is proposed. The speaker cover has at least one first layer and a second layer, wherein the first layer is an air-permeable layer and the second layer is a layer with through-holes for reducing dynamic pressure. Thus, a corresponding speaker arrangement may be provided which comprises a speaker and the speaker cover.

Through-holes are defined channels in the second layer that connect a first surface of the second layer to a second surface of the second layer, respectively, the first surface facing the second surface and serving as a contact surface for other overlying or underlying layers. The through-holes may be tubular and have the shape of a hollow cylinder. Cross connections between individual through-holes can be provided as an option, but are not necessary to cause the defined air flow in the second layer, since acoustic waves of the speaker are to enter the interior of the vehicle.

An air-permeable layer is understood as meaning a layer which can pass air, but in which no defined air channels were provided in the production of the first layer. An example of an air-permeable layer is a fabric or a material. An example of an air impermeable layer in this context is a plastic layer or a wood layer.

The speaker cover according to the disclosure can be used in a vehicle in particular. There, speakers are also installed in the footwell of the vehicle, where on the one hand an installed speaker to be protected from mechanical stress and dirt and also the sound quality of the speaker should not be degraded by a cover. Thus, the present disclosure contemplates a speaker cover capable of directing acoustic pressures through the existing through-holes in a defined way to relieve dynamic pressures caused during operation of the speaker so that an occupant does not experience mechanical vibrations.

The speaker cover according to the disclosure can be used in particular for low vibration frequencies of the speaker, in particular in a range from about 20 Hz to about 150 Hz. In this area, the multi-layered speaker cover is particularly effective and limits vibrations with amplitudes in the lower millimeter range or fractions thereof.

In an advantageous embodiment of the multi-layered speaker cover, the first layer can face away from the speaker and the second layer can face the speaker.

In this way, in the proper use of the speaker cover the speaker is additionally protected against dirt, since the continuous layer without through-holes faces away from the speaker as the first layer, in other words the continuous layer, faces the passenger compartment of the vehicle.

In some embodiments, the through-holes are arranged in an area of the speaker.

Thus, it is not necessary that the entire surface of the speaker cover in the second layer is provided with through-holes, but only in the area where sound waves are generated by the speaker. The speaker cover can be larger in area than the speaker itself and in such a case extends beyond the outer dimensions of the speaker.

In some embodiments, the through-holes pass vertically through the second layer.

Accordingly, the through-holes are arranged perpendicular to the two surfaces of the second layer and provide a connection between the two surfaces of the second layer along the shortest path. This arrangement of the through-holes is easy to manufacture and can be done using punching, for example. Alternatively, however, it is also possible to arrange oblique channels in the second layer.

Furthermore, it can be advantageous to provide each of the through-holes with the same cross-sectional area.

This means that the through-holes are the same size in terms of their flow cross section. The geometry of the through-holes can be selected arbitrarily, for example the through-holes can have a round cross-section or a polygonal cross-section. For example, the flow cross section of a single through-hole is in the order of 20 mm$^2$ to 1000 mm$^2$.

In a preferred embodiment of the multi-layered speaker cover, the first layer can be a protective layer.

A protective layer can be dirt-repellent, for example by way of a smooth surface on which no dust can settle. Further, the protective layer can be used to optically obscure the through-holes so that an occupant in a vehicle visually perceives neither the through-holes nor the actual speaker. This results in a consistent appearance and ensures that there are no ledges in a surface on which a person may be injured.

In a further embodiment of the multi-layered speaker cover, the speaker cover can have a third layer which is a rigid foam layer.

For example, such a foam layer can be formed from PU foam (polyurethane foam). A foam layer can easily cover an underlying speaker, without the speaker being impaired in its mechanical vibration properties. It is provided here that the dimensionally stable foam layer has no through-holes, since it is porous enough to transmit sound and since it is the task of the second layer, which is adjacent to the third layer when used as intended, to guide the path of the defined sound.

It can also be advantageous for the speaker cover to have a fourth layer which at least partially embeds the speaker.

Such a layer can be made of an EPP material or EPS material (EPP: expanded polypropylene, EPS: expanded polystyrene). The fourth layer, which comes into contact with the speaker in its intended use, can completely or partially enclose an outer contour of the speaker or its housing, for example. The fourth layer is installed peripherally on the speaker or overlapping the speaker. Such a layer can be used to counteract vibrations in the environment of the operating speaker. The fourth layer may be understood as an inlay to effect a first mechanical damping present in the operation of the speaker. Thus, between a foam layer as the third layer and the speaker, an inlay can be arranged as the fourth layer.

The different layers are different in their expression for each vehicle and each are adapted to the geometry of the vehicle. In particular, the airtight view in which the holes are introduced may be selected, for example, between 0.5 and 3 mm. The number of holes depends on the hole size. An estimated 50% of the membrane area of the speaker should be reached, i.e. the sum of the through-holes is about half the membrane area of the speaker.

Overall, the different layers of the speaker cover take on different technical functions. The fourth layer is used to reduce mechanical vibrations at the speaker itself by damping the speaker as mounted. The third layer is porous as a foam layer and can distribute the acoustic pressure of the speaker evenly within the third layer. In the second layer, dynamic pressures are relieved by providing channels so that the sound of the speaker can be conducted in a defined manner. The first layer of the speaker cover is a cover layer and is permeable to air without having defined channels. The first layer can protect the underlying layers and speaker from contaminants. Furthermore, the first cover layer has the advantage that the speaker is not visible to an occupant in its intended use.

Thus, the second layer and the fourth layer are used for the damping of vibrations issuing from a powered speaker in particular. However, the two layers differ in their mode of action. The fourth layer fixes the speaker and dampens vibration as an elastic molded part by isolating mechanical oscillations at the speaker from the environment. However, the second layer guides acoustic pressure through the speaker cover according to the disclosure so that the acoustic pressure causes no vibration in the environment, especially above the speaker in the vicinity of the speaker cover. The third layer performs a similar task as the fourth layer, namely a mechanical damping of vibrations emanating from the speaker during operation. In this case, the third layer can also be a mechanical protection for the speaker since it can completely cover the speaker and its dimensional stability can also absorb forces which act above the speaker cover, for example due to the weight of occupants.

In some embodiments, the multi-layered speaker cover is a floor mat for an interior space of a vehicle.

In such an embodiment, the floor mat can assume any geometric shape to adapt to the interior design of the footwell in the vehicle. Accordingly, the floor mat, at least in the two upper layers, the first and the second layer, is designed to be of an elastic shape so that it adapts to the base of the vehicle interior. Here, the third layer and/or fourth layer, if provided, can fill cavities in the foot area of the vehicle and be rigidly installed.

Accordingly, in the embodiment of a floor mat, a mat is provided which is arranged between components above the speaker. By a targeted design of the overlying components, in particular a vehicle floor mat, the vibrations or oscillations can be significantly reduced.

For example, PU foams, EPP foams or EPS foams are used for the mat. The foams used in this case are not perforated, otherwise this leads to unfavorable effects in terms of damping vibrations.

In particular, in this case targeted openings for preventing dynamic pressures are introduced into the air-impermeable areas of the floor mat. A layer structure with three or four layers is possible. According to one embodiment, in a four-layered construction a top layer is made of velour material and an underlying second layer is an air-impermeable heavy layer with through-holes in at least a portion of the heavy layer. In a third and fourth layer EPP and/or PU material may be used, i.e. the third layer being EPP material or PU material and the fourth layer being EPP material or PU material. In a preferred embodiment with three layers, the first layer comprises velour material, and the second layer is a heavy layer with through-holes in at least a partial area of the heavy layer. A third layer adjacent to the heavy layer comprises PU material.

The object of the disclosure is further achieved by a vehicle in which the inventive multi-layered speaker cover is installed. For example, the speaker cover is inserted in the form of a floor mat in the footwell of the vehicle. For example, such a floor mat can be present for the driver, the front passenger and in the rear of the vehicle for the passengers or in the trunk.

The disclosure relates to an interior design for vehicles to reduce vibrations on the vehicle during operation of a speaker, in particular in the area in which occupants may be present.

Overall, the solution according to the disclosure aims to avoid or at least substantially reduce acoustic sound waves which can manifest as dynamic pressures and emanate from powered speakers. For this purpose, the speaker cover according to the disclosure has at least one air-impermeable layer which is provided with through-holes or channels in order to selectively direct air flows through this otherwise air-impermeable layer. In this way, a large-scale vibration can be avoided by providing a defined air flow. The size of the through-holes is in this case dimensioned such that dynamic pressures originating from sound waves of the speaker are prevented.

Figure 2:
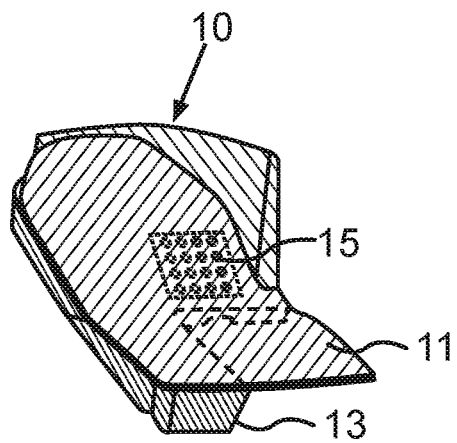
FIG. 2 shows a perspective view of a speaker cover in a vehicle, according to some embodiments of the disclosure.
Figure 3:
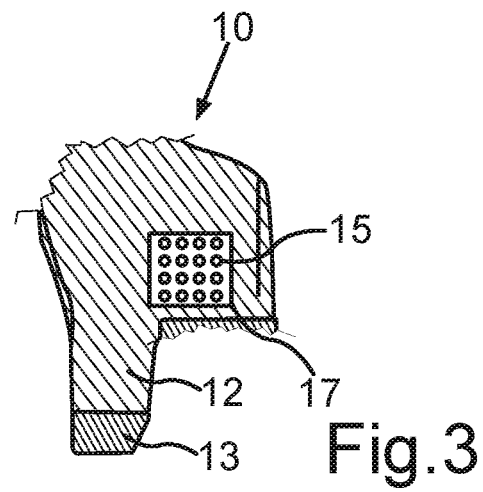
FIG. 3 shows another perspective view of a speaker cover in a vehicle without the first layer, according to some embodiments of the disclosure.

The principle of the present disclosure will now be explained in more detail with reference to an exemplary embodiment in the accompanying drawings. In the drawings, FIG. 1 shows a first embodiment of a multi-layered speaker cover according to the disclosure in sectional view. FIG. 2 shows a second embodiment of a speaker cover in a vehicle in a perspective view. FIG. 3 shows the second embodiment of FIG. 2, shown without the first layer.

FIG. 1 schematically shows a first exemplary embodiment of a multi-layered speaker cover 10 according to the disclosure in a sectional view for covering a speaker 20. The speaker 20 has a speaker body 21 with a membrane for generating sound waves. Furthermore, the speaker body 21 has a housing and a drive unit with an electrical voice coil and a magnet. The speaker body is connected to an acoustic chamber 21 or a resonant volume 21 in order to generate sound waves by means of the oscillating membrane of the speaker body 21, the sound waves then issuing into the surroundings, in particular by way of the speaker cover 10 according to the disclosure.

The speaker cover 10 has a total of four layers 11, 12, 13, 14, wherein a first layer 11 is an air-permeable layer and covers through-holes 15 of an underlying second layer 12 as a cover layer. The first layer 11 may be formed as a carpet with a fabric material or a velour. A third layer 13 adjoins the second layer 12 and is designed as an air-permeable layer, here a dimensionally stable foam layer in the form of PU foam. Adjacent to this third layer 13 is an underlying fourth layer 14 which has a recess and partially surrounds the speaker body 21, in particular embeds it at its lateral edge area and covers its upper area. The fourth layer is made of EPP material that is inherently air-permeable without having predefined channels. In one embodiment, the fourth layer 14 can be completely pierced by the speaker body 21. In another embodiment, the speaker body 21 does not penetrate the fourth layer. For example, the latter embodiment variant can be preferably selected when the fourth layer is PU material.

When operating the speaker 20 in FIG. 1, vibrations are mechanically damped by the third and fourth layers 13, 14. In the second layer 12, the acoustic pressure is reduced by the acoustic waves being guided in the form of an air flow 16 by channels produced as through-holes 15 of the second layer 12. In this case, the through-holes 15 are arranged in the area of the speaker body 21, in particular in the area of the membrane of the speaker 20. In the illustrated FIG. 1, this is an area above the speaker body 21 in the second layer 12.

By means of the proposed geometry and layering, in particular by the second layer 12, mechanical vibrations caused by sound waves from the speaker 20 are damped or prevented.

FIG. 2 and FIG. 3 show a second embodiment of a speaker cover 10 which is arranged as a floor mat in a vehicle. FIGS. 2 and 3 each show a section of a geometry of a footwell in a vehicle in a perspective view. A speaker 20 is installed in this area, the speaker being covered by the inventive speaker cover 10. The speaker cover 10 is flat so that it completely covers the footwell, or alternatively covers at least a portion thereof.

FIG. 2 shows the floor mat in a perspective plan view, with the first layer 11 being shown as the uppermost layer, the underlying through-holes 15 being concealed. FIG. 3 shows the floor mat of FIG. 2, wherein the first layer 11 is not shown, so that the through-holes 15 of the second layer 12 are visible. The through-holes 15 are arranged in an area 17 which covers a speaker. Thus, the floor mat 10 only has through-holes in the second layer 12 in this area 17. The remaining area of the second surface has no through-holes 15.

FIGS. 1 to 3 schematically show a multilayered structure of layers. It should be noted that individual layers are optional, such as the third and fourth layers. Furthermore, other layers may be present which are not shown in FIGS. 1 to 3. Furthermore, the arrangement of the speaker 20 with overlying layers is only an example. Depending on the installation location of the speaker, the layers shown can be tilted vertically and horizontally or interchanged so that the first layer faces away from the speaker and the second layer faces the speaker.

Overall, a vehicle floor mat is shown in FIGS. 2 and 3, in which oscillations and vibrations can be significantly reduced through the targeted design of the layers lying above the speaker. In particular, in this case targeted openings 15 are made in the air-impermeable areas of the second layer 12 of the floor mat, dynamic pressures being prevented by means of the openings. Overall, a reduction of vehicle vibrations caused by the operation of the speaker 20 is achieved.

This results in the advantage that oscillations and vibrations are barely noticeable for the vehicle occupants anymore. At the same time, the acoustics, in particular the acoustic pressure level of the speaker, are hardly affected. Thus, a space-saving package of speakers or a speaker system near the occupant is possible.

The invention claimed is:

1. A multi-layered speaker cover for covering a speaker, comprising:
   first, second and third layers, wherein
      the first layer is air-permeable;
      the second layer comprises an air impermeable material with a plurality of through-holes, wherein the plurality of through-holes partially cover an area of the second layer for reducing dynamic pressure;

the third layer is a dimensionally stable foam layer; and the first layer and the third layer cover the plurality of through-holes from opposite sides of the second layer.

2. The multi-layered speaker cover according to claim 1, wherein the plurality of through-holes pass perpendicularly through the second layer.

3. The multi-layered speaker cover according to claim 1, wherein the plurality of through-holes each have the same cross-sectional area.

4. The multi-layered speaker cover according to claim 1, wherein the first layer is a protective layer.

5. The multi-layered speaker cover according claim 1, wherein the multi-layered speaker cover is a floor mat for an interior space of a vehicle.

6. A speaker arrangement, comprising:
a speaker; and
a multi-layered speaker cover for covering the speaker, wherein the multi-layered speaker cover comprises first, second and third layers, wherein
the first layer is air-permeable;
the second layer comprises an air impermeable material with a plurality of through-holes, wherein the plurality of through-holes partially cover an area of the second layer for reducing dynamic pressure;
the third layer is a dimensionally stable foam layer; and
the first layer and the third layer cover the plurality of through-holes from opposite sides of the second layer.

7. The speaker arrangement according to claim 6, wherein the first layer faces away from the speaker and the second layer faces the speaker.

8. The speaker arrangement according to claim 6, wherein the plurality of through-holes are arranged in an area of the speaker.

9. The speaker arrangement according to claim 6, wherein the multi-layered speaker cover has a fourth layer which at least partially embeds the speaker.

10. A vehicle with a speaker arrangement, comprising:
a speaker; and
a multi-layered speaker cover for covering the speaker, wherein the multi-layered speaker cover comprises first, second and third layers, wherein
the first layer is air-permeable;
the second layer comprises an air impermeable material with a plurality of through-holes, wherein the plurality of through-holes partially cover an area of the second layer for reducing dynamic pressure;
the third layer is a dimensionally stable foam layer; and
the first layer and the third layer cover the plurality of through-holes from opposite sides of the second layer.

11. The multi-layered speaker cover according to claim 1, wherein the first layer comprises a fabric material and/or a velour.

12. The multi-layered speaker cover according to claim 1, wherein the air impermeable material comprises plastic and/or wood.

13. The multi-layered speaker cover according to claim 1, wherein the third layer is air permeable.

14. The multi-layered speaker cover according to claim 13, wherein the third layer comprises a PU (polyurethane) material.

15. The speaker arrangement according to claim 8, wherein the plurality of through-holes are arranged to partially cover the speaker.

16. The speaker arrangement according to claim 9, wherein the fourth layer comprises an EPP (expanded polypropylene) material and/or an EPS (expanded polystyrene) material.

17. The vehicle according to claim 10, wherein the first layer faces away from the speaker and the second layer faces the speaker.

18. The vehicle according to claim 10, wherein the plurality of through-holes are arranged in an area of the speaker.

19. The vehicle according to claim 10, wherein the multi-layered speaker cover has a fourth layer which at least partially embeds the speaker.

20. The vehicle according to claim 19, wherein the fourth layer comprises an EPP (expanded polypropylene) material and/or an EPS (expanded polystyrene) material.

* * * * *